US006887057B2

(12) United States Patent
Klassen (10) Patent No.: US 6,887,057 B2
(45) Date of Patent: May 3, 2005

(54) MINIMAL CONTACT SEAL POSITIVE DISPLACEMENT DEVICE METHOD AND APPARATUS

(75) Inventor: James B. Klassen, Lynden, WA (US)

(73) Assignee: Outland Technologies (USA) Inc., Calgary (CA)

( * ) Notice: Subject to any disclaimer, the term of this patent is extended or adjusted under 35 U.S.C. 154(b) by 0 days.

(21) Appl. No.: 10/059,560

(22) Filed: Jan. 29, 2002

(65) Prior Publication Data

US 2003/0231971 A1 Dec. 18, 2003

Related U.S. Application Data

(60) Provisional application No. 60/265,403, filed on Jan. 30, 2001.

(51) Int. Cl.[7] .................................................. F03C 2/00
(52) U.S. Cl. .......................... 418/195; 418/19; 418/20; 418/1
(58) Field of Search ............................ 418/195, 19, 20, 418/1; 73/261

(56) References Cited

U.S. PATENT DOCUMENTS

| 32,372 | A |   | 5/1861  | Jones              |         |
|--------|---|---|---------|--------------------|---------|
| 351,129 | A |   | 10/1886 | Salomo             |         |
| 914,155 | A |   | 3/1909  | Mills et al.       |         |
| 991,576 | A |   | 5/1911  | White              |         |
| 1,379,653 | A |   | 5/1921  | Shoemaker         |         |
| 2,101,051 | A |   | 12/1937 | Cuny               |         |
| 2,101,428 | A |   | 12/1937 | Cuny               |         |
| 2,242,058 | A |   | 5/1941  | Cuny               |         |
| 2,431,817 | A |   | 12/1947 | Mann               |         |
| 3,101,700 | A |   | 8/1963  | Bowdish            |         |
| 3,106,912 | A |   | 10/1963 | Kahlert            |         |
| 3,156,222 | A |   | 11/1964 | Miller, Jr.        |         |
| 3,236,186 | A | * | 2/1966  | Wildhaber          | 418/195 |
| 3,272,130 | A |   | 9/1966  | Mosbacher          |         |
| 3,816,038 | A |   | 6/1974  | Berry              |         |
| 3,816,039 | A |   | 6/1974  | Berry              |         |
| 3,856,440 | A | * | 12/1974 | Wildhaber          | 418/195 |
| 5,513,969 | A | * | 5/1996  | Arnold             | 418/195 |
| 5,704,767 | A | * | 1/1998  | Johnson            | 73/261  |

FOREIGN PATENT DOCUMENTS

| CA | 2069607 |   | 11/1993 |          |
|----|---------|---|---------|----------|
| CA | 2069607 A | * | 11/1993 | F04C/3/08 |
| DE | 1551081 |   | 4/1970  |          |
| DE | 2639760 |   | 3/1978  |          |
| DE | 3221994 |   | 12/1983 |          |
| DE | 3221994 A1 | * | 12/1983 | F01C/1/18 |
| FR | 916277  |   | 8/1946  |          |
| GB | 5686    |   | 11/1902 |          |
| GB | 805370  |   | 12/1958 |          |
| GB | 1099085 |   | 1/1968  |          |
| IT | 268459  |   | 1/1933  |          |
| JP | 43-29764 |   | 12/1943 |          |
| JP | 55-72683 |   | 5/1980  |          |
| WO | WO 99/61753 |   | 12/1999 |          |

OTHER PUBLICATIONS

Excerpt from a book titled "Rotary Piston Machines" by Felix Wankel, Classification of design principles for engines, pumps and compressors, 16 pages, 1965.
Granco Positive Displacement Rotary Pump product brochure, 6 pages, with attached article, Principles of operation and performance characteristics of Rotary Ball Pumps by Michael L. George, Challenge Manufacturing Co. Inc. Oakland, CA 4 pages, Plant Engineering Dec. 10, 1981.

* cited by examiner

Primary Examiner—Theresa Trieu
(74) Attorney, Agent, or Firm—Michael F. Hughes; Hughes Law Firm, PLLC (57) ABSTRACT

A positive displacement device that incorporates two rotors that are offset from collinear and each comprising a first and second set of vanes where the engagement surfaces of the first set of vanes are adapted to only engage when the rotors are in the top dead center location and the second set of lobes of each rotor only engage one another at the bottom dead center position of rotataion.

37 Claims, 4 Drawing Sheets

MINIMAL CONTACT SEAL POSITIVE DISPLACEMENT DEVICE METHOD AND APPARATUS

STATEMENT OF PRIORITY

This application claims priority of provisional application 60/265,403 filed on Jan. 30, 2001.

FIELD OF THE INVENTION

The invention relates to rotary positive displacement devices. The invention relates to rotor assemblies with two sets of rotor vanes where a top dead center set is functional for providing a seal at the top dead center location and a bottom dead center rotor set is functional for providing a seal at the bottom dead center location of the rotor assembly.

BACKGROUND OF THE INVENTION

Many rotary positive displacement devices have been devised and a common characteristic of positive displacement devices compared to centrifugal devices is the components of a positive displacement device come in contact during operation or have a thin fluid boundary. Contact can occur during start up and start up procedures as well as during certain operational environments. Some of the advantages of the present invention are discussed herein.

The invention has a wear-in tendency of the contact surfaces. The length of the lobe tips for the first and second rotor sets are staggered. The longer lobes seal only at the top of the rotation, and the shorter lobes seal only at the bottom of the rotation. The relative movement of the contacting surfaces at these points is such that a contact seal is maintained even if wear occurs on the rotors. Further, the lobes have a tendency to be self seating. Because the rotors are self-seating, there is less of a need for precision machining in many applications. Once seated, the rotors will provide that same seal integrity until the entire seal surface has been worn away allowing lower production cost. Other advantages of low precision manufacturing, allow less expensive fabrication of the rotors for various applications.

The lobes further are self sealing. The non driven rotor does not float rotationally but rather is held with a consistent "half force" against the driven rotor by the pressure of the fluid. A fluid film will still separate the two rotors at certain speeds and pressures with certain fluids; however, if this does not occur there is little detriment because the sliding velocity in the seal portion of the rotation is very low (reducing wear).

The design further has the tendency to create a device with increased efficiency. The present invention has slightly greater internal turbulence then the other rotary positive displacement pumps and motors; however, the present invention has greater volumetric efficiency.

The ability of the non-driven rotor to rotate slightly to make up for wear also allows it to rotate the other direction to allow larger chunks to pass through. In one example, rotors could allow 0.040" particles to pass through without damaging the rotors. Higher clearances are also possible. The variable gap for chunk pumping is ideal for many applications from mine pumps, coal pumps to jet-skis, etc.

In one form the present invention allows for replaceable seals. As seen in an embodiment herein there is only a small area that seals on each lobe allowing a simple manufacturing of the rotors from an easily fabricated material and then attach some wear tips thereto. Wear tips could be made from more expensive, resilient material while the remainder of the rotor assembly is constructed from less expensive material.

SUMMARY OF THE INVENTION

The invention is a device to convert energy that has a first rotor having an axis of rotation. The first rotor is adapted to rotate about the axis of rotation has having a longitudinal forward location and longitudinal rearward location. The first rotor has a first set of vanes having engagement surfaces located in the longitudinal forward region. The first rotor further has a second set of vanes having engagement surfaces that are located in a longitudinally rearward location, an outer surface that partially forms a sphere.

The device further has a second rotor having an axis of rotation and it is adapted to rotate about the axis of rotation. The second rotor has a longitudinal forward location and longitudinal rearward location and a first set of vanes having engagement surfaces located in the longitudinal forward region. The second rotor further has a second set of vanes having engagement surfaces that are located in a longitudinally rearward location and an outer surface that partially forms a sphere.

The device further has a casing that is adapted to house the said first rotor and the second rotor and has a top dead center location and a bottom dead center location. The casing comprises a first lateral region and a second lateral region where an inlet port is provided in the said first lateral region that provides communication to the said first and second rotor and an outlet port in the second lateral region that is in communication to the first and second rotors.

The first and second rotors are offset from being collinear by an angle alpha where the and the engagement surfaces of the first set of vanes of the first rotor are adapted to engage the engagement surfaces of the first set of vanes of the second rotor at the top dead center location and the engagement surfaces of the second set of vanes of the first rotor are adapted to engage the engagement surfaces of the second set of vanes of the second rotor at the bottom dead center location the engagement surfaces of the first and second set of vanes of the first and second rotors are not in engagement when located in the first and second lateral regions.

DETAILED DESCRIPTION OF PREFERRED EMBODIMENTS OF THE PRESENT INVENTION

Figure 1:
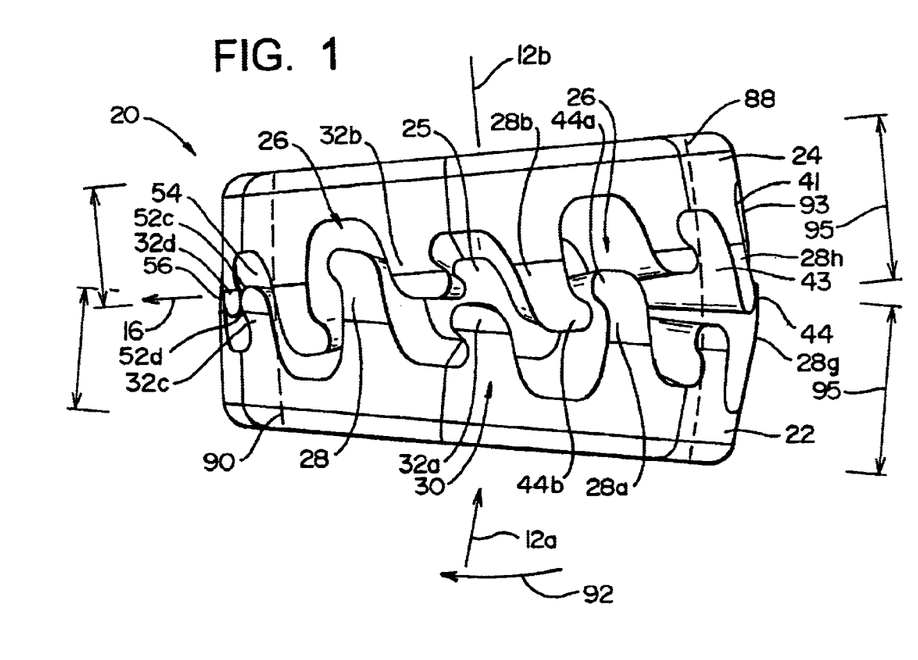
FIG. 1 is a side view of the rotor assembly taken along the lateral axis.
Figure 2:
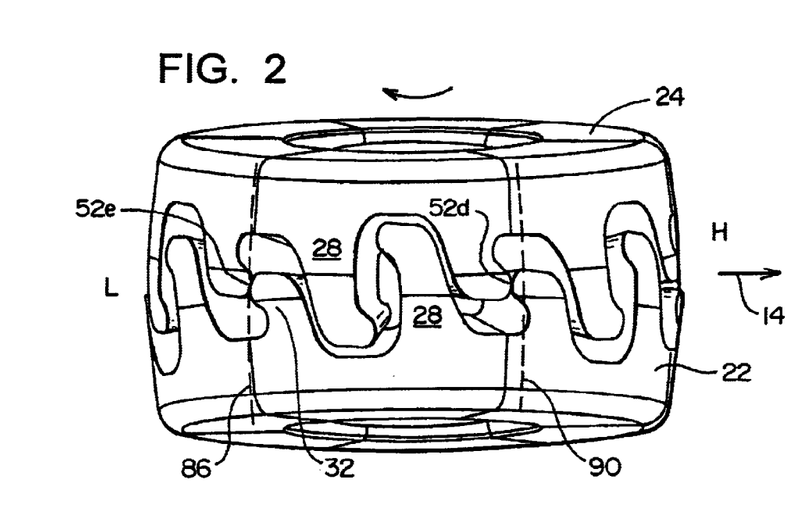
FIG. 2 is a rearward view of the bottom dead center region of the rotor assembly taken along the transverse axis.

To aid the description of the invention an axis systems is defined relevant to each rotor 22 and 24 where for rotor 22, the axis 12a ndicates a longitudinal axis and the direction from the base region of the rotor to the opposing rotor is defined as the forward direction. As shown in FIG. 2, the axis indicated at 14 indicates a lateral axis. Finally, as seen in FIG. 1, the axis indicated at 16 indicates a transverse axis 16 and the arrow indicating a rearward direction.

The description relates to positive displacement devices. U.S. Pat. Nos. 5,755196, 6,036,463 and U.S. Ser. No. 09/757,126 (published) are hereby fully incorporated by reference. The device is an engine defined as devices to convert energy that includes but not limited to pumps, motors, flow meters and compressors. The device is particularly advantageous with incompressible fluids due to the sealing nature of the vanes at top and bottom dead center locations (further described herein). The term fluid is defined as compressible and incompressible fluids as well as other particulate matter and mixtures that flows with respects to pressure differentials applied thereto. Displacing a fluid is defined as either compressing a fluid or transfer of an incompressible fluid from a high to low pressure location or allowing expansion of a fluid in a chamber. Engagement is defined as either having a fluid film or fluid film seal between two adjacent surfaces or be in contact or having interference between two surfaces where forceful contact occurs for a tight seal.

Figure 7:
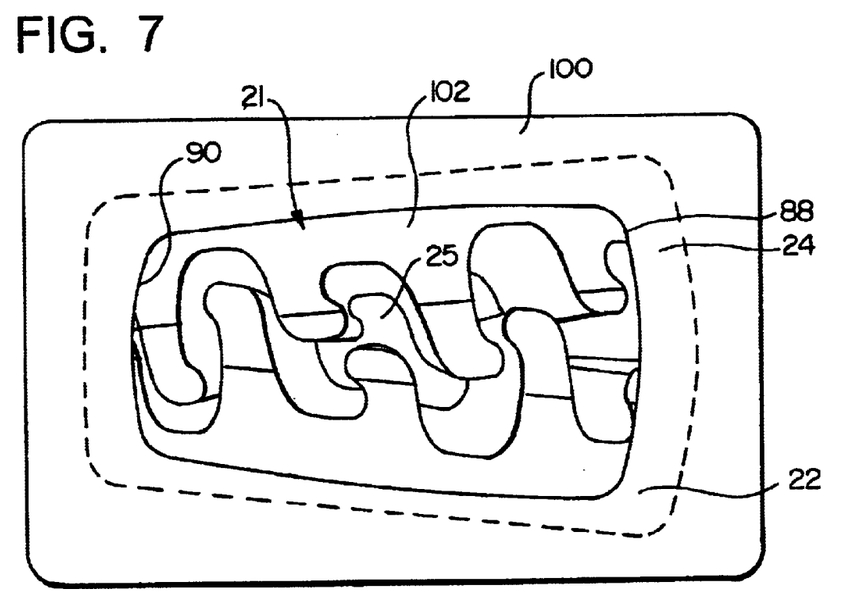
FIG. 7 is a front view of a port that provides access to the chambers of the rotors.

The device 18 comprises a rotor assembly 20 and a casing 100 (shown in FIG. 7). The rotor assembly 20 comprises a first rotor 22, a second rotor 24 and a center spherical region 25. The center spherical region 25 can either be a spherical ball or a portion of a sphere that is attached to one of the rotors 22 or 24. Further the center sphere can have a surface defining a cylindrical opening to allow a through shaft to pass therethrough. The shaft can be mounted to the power rotor that can be either 22 or 24.

The first rotor and the second rotor are substantially similar and hence the first rotor 22 will be described in detail with the understanding the description is applicable and relevant to the second rotor 24.

The first rotor 22 comprises a first rotor set 26 that comprise a plurality of top dead center (TDC) rotor vanes 28. The first rotor further comprises a second rotor set 30 that comprises a plurality of bottom dead center (BDC) rotor vanes 32.

Figure 3:
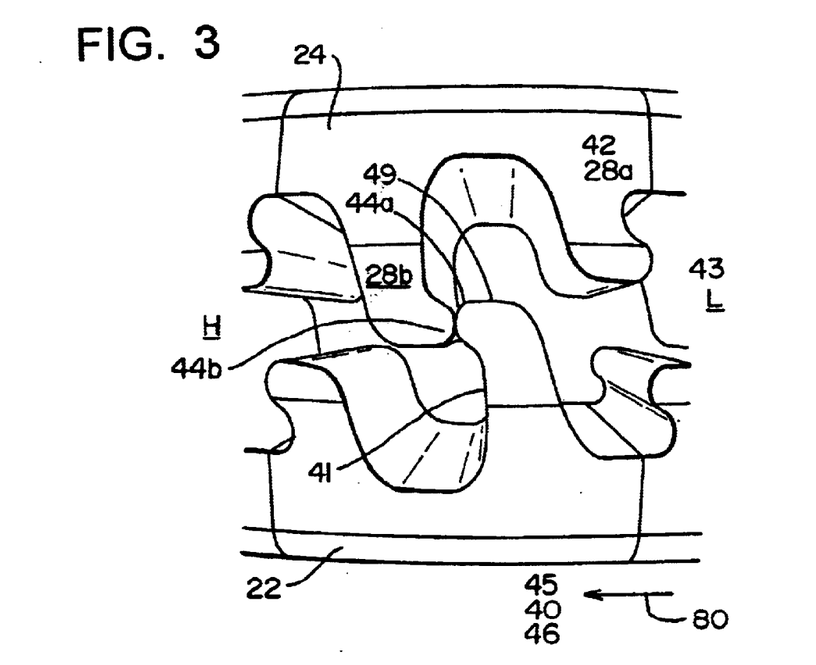
FIG. 3 is a view of the top dead center region of the rotor assembly shown a contact between two inverted TDC rotor vanes in a contact engagement position.

As shown in FIG. 3, the TDC rotor vanes 28 comprise a base region 40 and a head region 42. The head region 42 has a front contact surface 44 that is adapted to engage the front contact surface of an inverted TDC rotor vane 28b described further herein. The TDC rotor vane 28 further comprises a forward surface 41 and a rearward surface 43. Further, the surface 45 is the area above the tangential line 46 and defines at least part of a sphere. Finally, the upper surface 49 is located at the longitudinally forward region of the TDC rotor vane 28.

Figure 4:
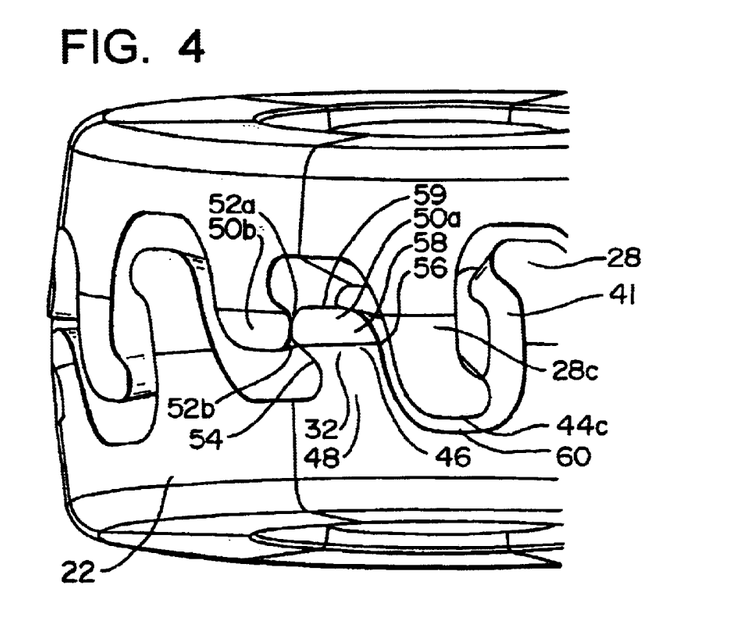
FIG. 4 is a view of the bottom dead center position of the rotor assembly where the BDC rotor vanes are in a contact engagement position.

Now referring to FIG. 4, the BDC rotor vanes 32 comprise a base region 40 and a head region 50. A contact surface 52 is located on the head region 50 and adapted to engage the contact surface of the inverted BDC rotor head 50b at the bottom dead center region of the rotor assembly 20. The BDC rotor vanes 32 further have a forward surface 54 and a surface 56. The surface 58 is defined as the area above line 46 and defines at least part of a sphere. The upper surface 59 is located at the longitudinally forward region of the BDC rotor vane 32.

The base region 60 is defined as the portion of the continuous surface between the forward surface 41 and the rearward surface 56. The surfaces 56, 60 and 41 collectively defined an open region (chamber region). As seen in FIG. 4, the TDC rotor vane 28c is positioned in the open region of the first rotor 22 where the surface 49 seen or any the connecting surfaces, do not touch or engage the surfaces 56, 60 and 41.

Figure 5:
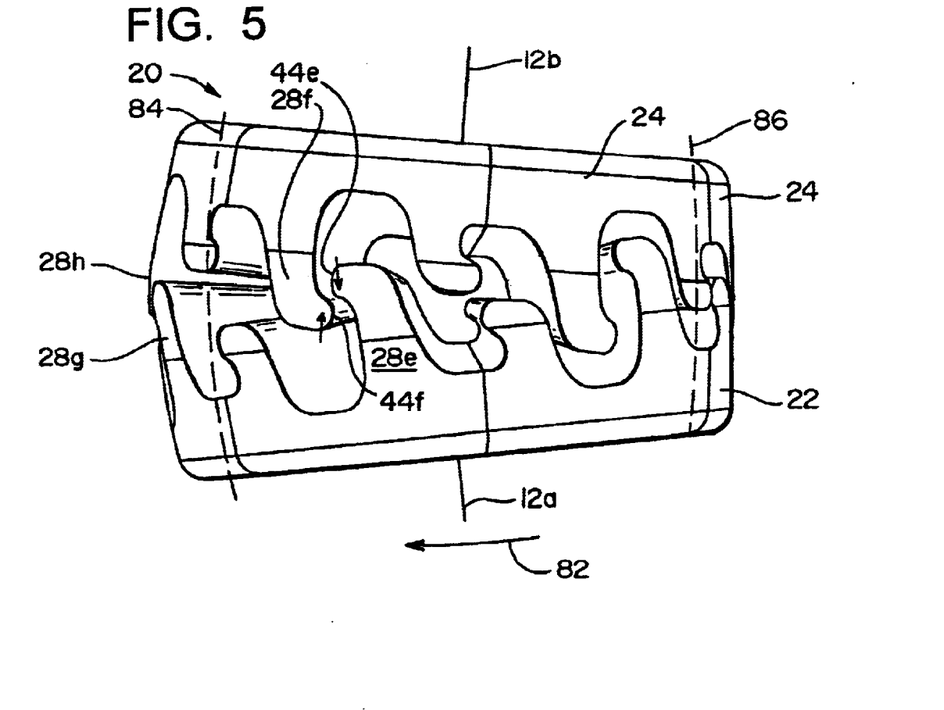
FIG. 5 is a side view of the low-pressure side of the rotor assembly.

There will now be discussion of the operations of the rotor assembly with primary reference to FIGS. 3 and 4. FIG. 3 is a view along the transverse axis at the top dead center portion of the rotor assembly. It should be noted that the rotor assembly would be contained in a housing where the TDC rotor vanes 28a and 28b are contain behind a wall casing and the radially outward surfaces intimately engaged thereto. On either lateral side of the rotor assembly are communication ports attached to the housing where the left-hand portion indicates a high-pressure fluid port "H" and the right hand portion indicates a low-pressure "L". As the rotor assemblies rotate in the direction indicated by arrow 82 the surfaces 44a and 44b engage one another to create a contact seal between the high-pressure side and the low-pressure side of the rotor assembly. In a similar manner, shown in FIG. 4 the bottom dead center region of the rotor assembly engages an inner surface of the casing (see FIG. 7) and the contact surfaces 52a and 52b engage one another to create a contact seal to prevent fluid leakage between the high-pressure and low-pressure ports. FIG. 5 is a view along the lateral axis showing the low-pressure region of the rotor assembly 20 the first rotor 22 rotates about the longitudinal axis 12a while a second rotor 24 rotates about the longitudinal axis 12b where 12a and 12b are offset from being collinear by an angle alpha ($\alpha$). For exemplary purposes the TDC rotor vanes 28e and 28f have will be discussed in detail with the understanding the analysis is relevant to all the TDC rotor vanes at respective positions along a rotational cycle. As the first and second rotors 22 and 24 rotates in the direction indicated by arrow 80 to in FIG. 5 the contact surfaces 44e and 44f approach one another. Because the area between the lines 84 and 86 are exposed to a fluid (a low-pressure fluid relative to the exit port), there is no need to have a seal between the open regions of the rotors 22 and 24. However, as the TDC rotor vanes rotates to a position indicated at TDC rotor vanes 28g and 28h, the surfaces 44 of each respective TDC rotor head engage one another to create a seal at the top dead center region and hence the fluid is now isolated from the low-pressure region. Now referring to FIG. 1, there is a view of the high-pressure region where the high-pressure port exists between the lines 88 and 90 which represents the edges of the casing. As seen in this FIG. 1 the TDC rotor vanes 28g and 28h are maintaining a seal between the high pressure and low pressure sides. As these TDC rotor vanes advance forwardly in a rotational manner as indicated by arrow 92 to a position shown by TDC rotor vanes 28a and 28b it can be seen that the contact surfaces 44a and 44b disengage from one another as the fluid is ejected from the open area into the high-pressure port. A similar analysis can be conducted for the BDC rotor vanes with reference to FIG. 1, 4 and 5. As seen in FIG. 1, the BDC rotor vanes 32a and 32b are approaching one another as the rotors 22 and 24 rotates about the longitudinal axis 12a and 12b respectively. When the BDC rotors reach a rotational position as indicated by 32c and 32b, they are contained behind the interior wall of the casing and the contact surfaces 52c and 52d engage one another in a contact seal arrangement. Therefore, the combination of the TDC rotor vanes 28g and 28h as well as the BDC rotor vanes 32c and 32b provide contact seals between the high-pressure side and a low-pressure side of the rotor assembly. It should be noted that the distance between the casing port parameters 84 and 88 are slightly greater than the distance between two adjacent TDC rotors. This placement is important so at least one combination of TDC rotors (from rotor assemblies 22 and 24) are in a contact engagement to provide a seal. Likewise, the rotational distance between casing port edges 86 and 90 are a distance slightly greater than the rotational distance between two adjacent BDC rotors.

Figure 6:
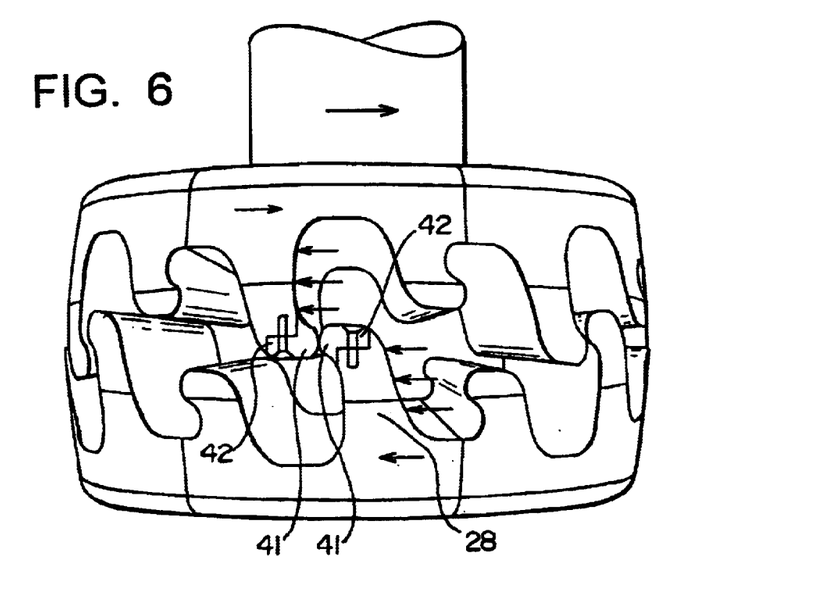
FIG. 6 is a front view of the top dead center position shown a second embodiment of the present invention with replaceable contact components.

FIG. 6 shows a second embodiment of the present invention where a contact component 41 is located at the head regions 42 and are removable and replaceable. The contact components 41 can be attached to the base region 48 in a variety of methods, one such means is using an attachment screw where a threaded recessed portion is located on the contact component 41 and a second recessed threaded portion is located in the TDC head of vane 28 where the central axis of the recessed portions corresponding location. The second embodiment is particularly advantageous for replacing the head components.

It should be noted that in the preferred embodiment, the shaft indicated by axis 12a would have a greater torque on the first rotor 22 to maintain a proper contact seal between the rotor vanes. If the rotor assembly 20 were to be run and reverse (i.e. opposite of arrows 80, 82, and 92), then shaft indicated by axis 12b attached to the second rotor 24 would have a greater rotational torque than the shaft indicated by 12a. It should be noted that the shaft attached to either rotor 22 or 24 would have a sufficient diameter to handle rotational torque.

If the rotor assembly 20 is constructed from a semi flexible material and is constructed in a manner where the contact between the inverted and opposing rotor vanes 28 and 32 is a positive contact where a constant pressure is applied between the surfaces 44 of the TDC rotors 28 and 52 for the BDC rotors 32. This would be advantageous to create an absolute seal where there is no fluid boundary between the adjacent contact surfaces for the inverted and opposing rotors.

As shown in FIG. 1, the corresponding engagement surfaces 44 of the first set of vanes of the first and second rotors is located at a longitudinally forward location (with respects to each rotor where the forward direction is generally toward the opposing rotor). The mean surface location is the average point of contact of the corresponding engagement surfaces. On the left hand side of FIG. 1 the corresponding engagement surfaces 52c and 52d (defined as two adjacent engaged enagement surfaces of opposing vanes of the second set of vanes for the first and second rotors) of the second set of vanes for the first and second rotor have a mean location in the longitudinal direction of each rotor that is positioned longitudinally rearward with respects to the mean longitudinal location of the engagement surface of the first set of vanes 28 and 32. In other words if a base reference point is chosen for each rotor (e.g. the longitudinally rearward face of each rotor) the average location of the engagement region of the engagement surfaces 44 for the first set of vanes is greater than the engagement region of the engagement surfaces 32 for the second set of vanes. The implication of this is a constant "half force" is applied to the slave rotor 24 during rotation. If the power rotor 22 is driven by a torqueing force indicated at 92 (a shaft could be attached thereto), the exposed port in FIG. 1 would be a high pressure port. Therefore the chamber 93 that is in communication with the lower pressure port on the other side of the device in FIG. 1 (not visible) has low pressure acting upon the surface 41 and high pressure acting upon surface 43 at the top dead center location. On the opposing transverse location at the bottom dead center location, the surface 54 of the vane of the second set of vanes 32 for the slave rotor 24 is in the sealed region and behind the sealed wall of the casing (the casing line is indicated at 90 where the inner wall of the casing engages the outer surfaces of the rotors 22 and 24). The surface 54 is subjected to high pressure and the opposing surface 56 on the other side of the vane is subjected to low pressure. By taking a net rotational pressure-force accounting (the pressure times the surface areas), a counter torque is produced upon the rotor 22 that opposes the torque 92 on the rotor 24. In other words the mean engagement distance 95 is greater than the mean engagement surfaces distance 97 for the second set of vanes 32. Therefore the high pressure that acts upon the rotors at the TDC location of the casing has a greater longitudinal distance over the BDC location and a rotational half-force or differential force is created which is a function of the difference of the distances 95 and 97. This rotational torque is advantageous for providing a seal. Further, the rotors 22 and 24 are rotationally separable to the point where the backside surfaces of the opposing vanes come in contact with one another. Therefore particulate material can pass through the rotors and even between engaged engagement surfaces of corresponding vanes and the rotors will rotate slightly with respects to each other to allow this intrusion where the differential force will bias the rotors together again after the chunk has passed.

As shown in FIG. 7, the rotor set 21 is housed in the casing 100 where the dashed lines indicate the profile of the rotors 22 and 24. An open port 102 is defined by the casing were edges 88 and 90 define the location where the sealing region begins at TDC and BDC to create a seal between the high and low pressure ports. The port 102 can either function as a low or high pressure port depending upon which rotor has an input torque applied thereto. In a preferred form a shaft is attached to the power rotor and the shaft extends through the casing 100. The casing 100 can be made from two parts. In one form the two parts can be identical wit the exception of any preferred shaft openings. Further the rotors 22 and 24 can be substantially identical and manufactured from the same process. This aids in production and inventory issues dealing with the components. Of course the port 102 can converge to a common circular connection region to be attached to piping elements. Of course a variety of casing designs can be employed. The important aspect of the casing is the TDC and BDC regions should provide a seal with the outer surface of the rotors and the radial width of the seal region should be close to the radial width of the two adjacent engagement surfaces a set of vanes. In other words at the BDC location as shown in FIG. 2, the radial (angular) width of the surfaces 52e and 52d should be the radial width of the sealing region of the casing at BDC for a zero dwell angle seal. A zero dwell angle seal means that as soon as the forward engaged surfaces indicated at 52e are exposed to the low pressure port the engaged surfaces indicated at 52d are entering the sealed region. A positive dwell is where both the forward and trailing engaged surfaces are in a sealed region.

The second aspect of designing a casing is the location of where the BDC and TDC sealing rotationally begins and ends. In general the volumetric change in the chambers is minimal at bottom dead center and top dead center and at the lateral regions (first and second lateral regions) the rate of volume change is maximized. It is desirable to have minimal volumetric change in a sealed chamber such as that at BDC and TDC. Therefore the location of the sealing surfaces of the casing are only located at the TDC and BDC regions. If a positive dwell angle is used than there would be a slight amount of leakage as the volume in the sealed chambers changes slightly.

Therefore it can be appreciated that the longer lobes seal only at the top of the rotation, and the shorter lobes seal only at the bottom of the rotation. The relative movement of the contacting surfaces at these points is such that a contact seal is maintained even if wear occurs on the rotors. In one example, at 3" in diameter, the rotors in the picture can experience close to ¼" of material wear before the pump starts to lose its seal integrity.

Because the rotors are self-seating, there is less of a need for precision machining in many applications. In applications such as down hole or oilfield mud pumps, for example, the parts could be casted (or other low precision process) and then allowed to seat themselves in operation. Once seated, the rotors will provide that same seal integrity until the entire seal surface has been worn away allowing lower production cost.

Other advantages of low precision manufacturing, allow less expensive fabrication of the rotors for various applications such as hand pumps for third world countries where parts could be cast from urethane and probably could potentially be used for medical applications where achieving a perfect seal at 6 psi would be far easier to achieve at lower cost with the design of the present invention.

The lobes further are self sealing. The slave rotor does not float rotationally but rather is held with a consistent "half force" against the driven rotor by the pressure of the fluid. A fluid film will still separate the two rotors at certain speeds and pressures with certain fluids; however, if this does not occur there is little detriment because the sliding velocity in the seal portion of the rotation is very low (reducing wear). The sliding speed of a 3" diameter new tech rotor at 10,000 rpm will be the same as a large mud pump at about 900 rpm (approx.). At this high speed the rotor assembly is still within the recommended maximum contact surface speed for abrasive applications.

The design further has the tendency to create a device with increased efficiency. The present invention has slightly greater internal turbulence then the other rotary positive displacement pumps and motors; however, the present invention has greater volumetric efficiency. In one example the apparatus of the present invention has a 0.001"–0.0001" gap between the rotors leaving only the rotor-to-casing gap as a fluid leakage path. In many applications, efficiencies of 90% or greater should be possible with low tolerance parts.

As seen in the second embodiment there is only small areas that seals on each lobe allowing simple manufacturing of the rotors from an easily fabricated material and then attach some wear tips thereto. The wear tips could be ceramic for some applications or even a urethane material in lower pressure applications. The wear tips will be especially suited to larger installations such as hydropower generation turbines. Wear tips could be made from more expensive, resilient material while the remainder of the rotor assembly is constructed from less expensive material.

The present invention could further be used as a flow meter where a rotational counter determines the number of rotations of the rotors and the amount of volume of fluid that is displaced during per unit of rotation is a known value.

Of course the present invention can further be used as a power generating device where fluid, preferably incompressible fluid, passing through the chambers of the rotors will create torque upon an output shaft attached to one of the rotors for output work (e.g. attach the shaft to a generator for output power).

While the invention is susceptible of various modifications and alternative forms, specific embodiments thereof have been shown by way of example in the drawings and described in detail. It should be understood, however, that it is not intended to limit the invention to the particular forms disclosed, but, on the contrary, the intention is to cover all modifications, equivalents and alternatives falling within the spirit and scope of the invention as expressed in the appended claims.

I claim:

1. A method of increasing the pressure of a fluid comprising the steps of:

retrieving a rotor set comprising a first and second rotor that are mounted about an axis of rotation that is offset from being colinear and the rotors having a top dead center location and a bottom dead center location where the each rotor has a first set of vanes and a second set of vanes where the first set of vanes have engagement surfaces that are located in the longitudinally forward location of each rotor and the engagement surfaces of the vanes of the opposing first and second rotors are adapted to engage one another only at the top dead center location, the rotors each further comprising a second set of vanes where each vane has an engagement surface where opposing vane of the second set of vanes on the first and second rotor is only in engagement at the bottom dead center location, the volume between the first and second rotors defines chamber regions, positioning the rotors in a casing where the casing has an inner surface that engages an outer surface of the rotors at the bottom dead center and top dead center locations where a first lateral surface of the casing defines an inlet port and a second lateral surface defines an outlet port, providing communication from the inlet port to the fluid and rotating the rotors so the chamber regions in communication with the inlet port are expanding, passing the fluid past the top dead center location where two adjacent engaged enagement surfaces of opposing vanes of the first set of vanes for the first and second rotors and the inner wall of the casing creates a seal from the outlet port and the inlet port and discharging a portion of the fluid to the outlet port and two adjacent engaged enagement surfaces of opposing vanes of the second set of vanes for the first and second rotors and the inner surface of the casing at the bottom dead center location further provides a seal from the outlet port to the inlet port.

2. The method as recited in claim 1 where a center sphere is positioned interposed between the first and second rotors.

3. The method as recited in claim 1 whereby each engagement surface of the first set of vanes for the first rotor has a corresponding engagement surface for the first set of vanes for the second rotor.

4. The method as recited in claim 1 where the vanes of the first set of vanes are rotationally interposed between the vanes of the second set of vanes for the first rotor.

5. The method as recited in claim 1 where the device is adapted to receive incompressible fluid from the inlet port and is further adapted to discharge the incompressible fluid at the discharge port.

6. The method as recited in claim 5 where corresponding engagement surfaces fo the first and second rotors of the first set of vanes only engage at the top dead center region.

7. The method as recited in claim 1 where the first rotor is driven and the second rotor is a slave rotor.

8. The method as recited in claim 7 where the engagement surface of the first set of vanes for the first and second rotors has a mean location that is longitudinally forward with respects to the mean location of the engagement surfaces of the second set of vanes of the first and second rotors.

9. The method as recited in claim 8 where the slave rotor has an opposing counter torque to the power rotor that is a function of the diference of the mean location of the enagement surfaces of the first and second set of vanes of the first and second rotors.

10. A device to convert energy comprising:
  a first rotor having an axis of rotation and the first rotor is adapted to rotate about said axis of rotation and having a longitudinal forward location and longitudinal rearward location, a first set of vanes having engagement surfaces located in the longitudinal forward region, a second set of vanes having engagement surfaces that are located in a longitudinally rearward location, an outer surface that partially forms a sphere;
  a second rotor having an axis of rotation and adapted to rotate about said axis of rotation and having a longitudinal forward location and longitudinal rearward location, a first set of vanes having engagement surfaces located in the longitudinal forward region, a second set of vanes having engagement surfaces that are located in a longitudinally rearward location, an outer surface that partially forms a sphere;
  a casing that is adapted to house the said first rotor and the second rotor and having a top dead center location and a bottom dead center location, the casing comprising a first lateral region and a second lateral region where an inlet port is provided in the said first lateral region that provides communication to the said first and second rotor and an outlet port in the second lateral region that is in communication to the first and second rotors;
  whereas the first and second rotors are offset from being collinear by an angle alpha where the engagement surfaces of the first set of vanes of the first rotor are adapted to engage the engagement surfaces of the first set of vanes of the second rotor at the said top dead center location and the engagement surfaces of the second set of vanes of the first rotor are adapted to engage the engagement surfaces of the second set of vanes of the second rotor at the bottom dead center location the engagement surfaces of the first and second set of vanes of the first and second rotors are not in engagement when located in the first and second lateral regions.

11. The device as recited in claim 10 where the first and second set of vanes of the first and second rotors collectively define chambers.

12. The device as recited in claim 11 where the said chambers are sealed at the top dead center and bottom dead center locations where the casing engages an outer surface of the first and second rotors to created a top dead center sealed chamber and a bottom dead center sealed chamber.

13. The device as recited in claim 10 where a center sphere is positioned interposed between the first and second rotors.

14. The device as recited in claim 10 whereby each engagement surface of the first set of vanes for the first rotor has a corresponding engagement surface for the first set of vanes for the second rotor.

15. The device as recited in claim 14 where corresponding engagement surfaces fo the first and second rotors of the first set of vanes only engage at the top dead center region.

16. The device as recited in claim 14 where the inlet port is defined a low pressure region and the outlet port is a high pressure region.

17. The device as recited in claim 16 where the corresponding engagement surfaces of the first set of vanes of the first and second rotors provides a seal between the high and low pressure regions.

18. The device as recited in claim 14 whereby each corresponding surface of the first set of vanes is in face to face engagement.

19. The device as recited in claim 10 where the vanes of the first set of vanes are rotationally interposed between the vanes of the second set of vanes for the first rotor.

20. The device as recited in claim 10 where the device is adapted to receive incompressible fluid from the inlet port and is further adapted to discharge the incompressible fluid at the discharge port.

21. The device as recited in claim 10 where the first rotor is driven and the second rotor is a slave rotor.

22. The device as recited in claim 21 where the engagement surface of the first set of vanes for the first and second rotors has a mean location that is longitudinally forward with respects to the mean location of the engagement surfaces of the second set of vanes of the first and second rotors.

23. The device as recited in claim 22 where the slave rotor has an opposing counter torque to the power rotor that is a function of the diference of the mean location of the enagement surfaces of the first and second set of vanes of the first and second rotors.

24. The device as recited in claim 22 where the net force of fluid imposed upon the slave rotor creates a counter torque opposing the rotational torque on the power rotor to create seal at the engagement surfaces that are engaged with one another at the top dead center location.

25. The device as recited in claim 10 where the first rotor is substantially identical to the second rotor.

26. The device as recited in claim 10 where a rotational counter is attached to the first rotor.

27. The device as recited in claim 26 where the volumetric throughput of the rotors from the inlet port to the outlet port is a first known value per unit of rotation of the first and second rotors and the volumetric throughput of the device is a determined from the counter and the first known value.

28. A pump that is adapted to increase the pressure of an operating fluid, pump comprising:
  a first rotor having an axis of rotation and the first rotor is adapted to rotate about said axis of rotation and having a longitudinal forward location and longitudinal rearward location, a first set of vanes having engagement surfaces located in the longitudinal forward region, a second set of vanes having engagement surfaces that are located in a longitudinally rearward location, an outer surface that partially forms a sphere;
  a second rotor having an axis of rotation and adapted to rotate about said axis of rotation and having a longitudinal forward location and longitudinal rearward location, a first set of vanes having engagement surfaces located in the longitudinal forward region, a second set of vanes having engagement surfaces that are located in a longitudinally rearward location, an outer surface that partially forms a sphere;
  a casing that is adapted to house the said first rotor and the second rotor and having a top dead center location and a bottom dead center location, the casing comprising a first lateral region and a second lateral region where an inlet port is provided in the said first lateral region that provides communication to the said first and second rotor and an outlet port in the second lateral region that is in communication to the first and second rotors and the casing at the top dead center and bottom dead center location engages the outer surfaces of the first and second rotor to provide a seal from the inlet port to the outlet port;

whereas the first and second rotors are offset from being collinear by an angle alpha where the engagement surfaces of the first set of vanes of the first rotor are adapted to engage the engagement surfaces of the first set of vanes of the second rotor at the said top dead center location and the engagement surfaces of the second set of vanes of the first rotor are adapted to engage the engagement surfaces of the second set of vanes of the second rotor at the bottom dead center location the engagement surfaces of the first and second set of vanes of the first and second rotors are not in engagement when located in the first and second lateral regions.

29. The pump as recited in claim 28 where the first and second set of vanes of the first and second rotors collectively define chambers.

30. The pump as recited in claim 29 where the chambers change in volume in the first and second lateral regions.

31. The device as recited in claim 28 where a center sphere is positioned interposed between the first and second rotors.

32. The device as recited in claim 28 whereby each engagement surface of the first set of vanes for the first rotor has a corresponding engagement surface for the first set of vanes for the second rotor.

33. The device as recited in claim 32 where corresponding engagement surfaces fo the first and second rotors of the first set of vanes only engage at the top dead center region.

34. The device as recited in claim 32 where the inlet port is defined a low pressure region and the outlet port is a high pressure region.

35. The device as recited in claim 34 where the corresponding engagement surfaces of the first set of vanes of the first and second rotors provides a seal between the high and low pressure regions.

36. The device as recited in claim 28 where the vanes of the first set of vanes are rotationally interposed between the vanes of the second set of vanes for the first rotor.

37. The device as recited in claim 28 where the device is adapted to receive incompressible fluid from the inlet port and is further adapted to discharge the incompressible fluid at the discharge port.

* * * * *